United States Patent [19]

Richardson

[11] Patent Number: 4,845,161
[45] Date of Patent: Jul. 4, 1989

[54] POLYOXYMETHYLENE/POLYURETHANE COMPOSITIONS CONTAINING POLYCARBODIIMIDE

[75] Inventor: Paul N. Richardson, Wilmington, Del.

[73] Assignee: E. I. Du Pont de Nemours and Company, Wilmington, Del.

[21] Appl. No.: 125,754

[22] Filed: Nov. 23, 1987

Related U.S. Application Data

[63] Continuation of Ser. No. 579,912, Feb. 21, 1984, abandoned, which is a continuation-in-part of Ser. No. 469,759, Feb. 25, 1983, abandoned.

[51] Int. Cl.⁴ .............................................. C08L 75/04
[52] U.S. Cl. .................................... 525/399; 525/907
[58] Field of Search .............................. 525/399, 907

[56] References Cited

U.S. PATENT DOCUMENTS

| | | | |
|---|---|---|---|
| 3,193,522 | 7/1965 | Neumann | 260/45.9 |
| 3,711,439 | 1/1973 | Loew | 525/399 |
| 4,277,577 | 7/1981 | Burg et al. | 525/154 |
| 4,293,469 | 10/1981 | Edelman | 260/45.9 P |

FOREIGN PATENT DOCUMENTS

| | | |
|---|---|---|
| 997521 | 9/1976 | Canada . |
| 0116456 | 8/1984 | European Pat. Off. . |
| 0117664 | 9/1984 | European Pat. Off. . |
| 993600 | 5/1965 | United Kingdom . |
| 1009883 | 11/1965 | United Kingdom . |
| 1017244 | 1/1966 | United Kingdom . |
| WO8103027 | 10/1981 | World Int. Prop. O. . |

*Primary Examiner*—Lewis T. Jacobs
*Assistant Examiner*—A. Carrillo

[57] ABSTRACT

Polyoxymethylene/thermoplastic polyurethane compositions having 5-40 weight percent polyurethane are modified by incorporating therein 0.05-1.0 weight percent of a polycarbodiimide (or a mixture of polycarbodiimides) having a molecular weight of about 1000 and containing units of the formula

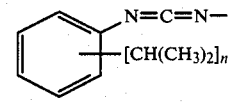

where n has an average value of about 3, to improve resistance to discoloration and decomposition.

17 Claims, No Drawings

POLYOXYMETHYLENE/POLYURETHANE COMPOSITIONS CONTAINING POLYCARBODIIMIDE

CROSS-REFERENCE TO RELATED APPLICATION

This application is a continuation of application Ser. No. 579,912 filed Feb. 21, 1984, now abandoned, which is a continuation-in part of U.S. patent application Ser. No. 469,759, filed Feb. 25, 1983 now abandoned.

1. Technical Field

This invention relates to certain polyoxymethylene compositions which are characterized by improved resistance to discoloration and decomposition. Polyoxymethylene compositions are generally understood to include compositions based on homopolymers of formaldehyde or of cyclic oligomers of formaldehyde, for example trioxane, the terminal groups of which are end-capped by esterification or etherification, as well as copolymers of formaldehyde or of cyclic oligomers of formaldehyde, with oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyoxymethylene of relatively high number average molecular weight, i.e. 20,000 to 100,000 are useful in preparing semi-finished and finished articles by any of the techniques commonly used with thermoplastic materials, e.g. compression molding, injection molding, extrusion, blow molding, rotational molding, melt spinning, stamping and thermoforming. Finished products made from such compositions possess extremely desirable physical properties, including high stiffness, strength and solvent resistance. Polyoxymethylene compositions have been recently developed containing 5–40 weight percent of certain thermoplastic polyurethanes and having extraordinary toughness and/or impact resistance. However it has been discovered that such polyoxymethylene/polyurethane compositions discolor and/or decompose under certain conditions, particularly when hold-up time is excessive during molding or other melt processing operations. This invention relates to improved polyoxymethylene/polyurethane compositions in which the discoloration and decomposition problems have been significantly reduced or eliminated.

2. Background Art

U.S. Pat. application Ser. No. 464,412, filed Feb. 7, 1983 by E. A. Flexman, now abandoned, and its copending continuation-in-part U.S. patent application Ser. No. 570,036, filed Jan. 16, 1984, now abandoned, discloses polyoxymethylene compositions having extraordinary impact resistance i.e. a Gardner impact value (measured according to ASTM D-3029, Method G, Geometry D using a 3.6 kg (8 pound) weight and injection molded 7.62×12.7×0.16 cm (3×5×1/16 in) plaques of greater than 9 J (80 in-lb), which compositions consist essentially of (a) 5–15 weight percent of at least one thermoplastic polyurethane, which polyurethane has a glass transition temperature of lower than 0° C. and
(b) 85–95 weight percent of at least one polyoxymethylene polymer, which polyoxymethylene polymer has a molecular weight of from 20,000 to 100,000.

the above-stated percentages being based on the total amount of components (a) and (b) only, the thermoplastic polyurethane being dispersed throughout the polyoxymethylene polymer as discrete particles, and the composition having a Gardner impact value of greater than 9J.

U.S. patent application Ser. No. 464,411, filed Feb. 7, 1983 by E. A. Flexman now abandoned and its copending continuation-in-part U.S. patent application Ser. No. 570,037, filed Jan. 16, 1984, now abandoned, discloses polyoxymethylene compositions having extraordinary toughness, i.e. a notched Izod value (measured according to ASTM D-256, Method A) of greater than 375 J/m (7.0 ft-lb/in which compositions consist essentially of (a) greater than 15 weight percent and not more than 40 weight percent of at least one thermoplastic polyurethane, which polyurethane has a glass transition temperature of lower than −15° C. and
(b) at least 60 weight percent and less than 85 weight percent of at least one polyoxymethylene polymer, which polyoxymethylene polymer has a molecular weight of from 20,000 to 100,000, the above-stated percentages being based on the total amount of components (a) and (b) only, the thermoplastic polyurethane being dispersed throughout the polyoxymethylene polymer as a separate phase having an average cross-sectional size in the minimum of not greater than 0.9 microns, and the composition having an Izod value of greater than 375 J/m.

The polyoxymethylene compositions disclosed in these two copending applications include compositions which can be improved by the present invention to give polyoxymethylene compositions characterized by improved resistance to discoloration and decomposition.

Polycarbodiimides are known to improve the hydrolytic stability of plastics containing ester groups, including millable gum polyurethanes, however typical formulations include 0.5 weight percent or more of the polycarbodiimide (See, for example, U.S. Pat. No. 3,711,439, granted Jan. 16, 1973 to Loew). In addition, the polyoxymethylene/polyurethane compositions described in the two above-cited copending applications of Flexman were not previously known, so that it could not be stated that the discoloration and decomposition problems of such compositions would be known or obvious, nor that polycarbodiimides would solve those problems, nor that other well-known hindered phenolic antioxidants would not solve those problems, nor that polycarbodiimides would solve those problems without also adversely affecting the unique properties of such compositions, including their extraordinary impact resistance and/or toughness.

Similarly, polycarbodiimides are also known to improve the thermal stability of polyoxymethylene polymers, however here again typical formulations include 0.5 weight percent or more of the polycarbodiimide (See, for example, British Pat. No. 993,600, complete specification published May 26, 1965). In addition, as mentioned above, the polyoxymethylene/polyurethane compositions described in the two above-cited copending applications of Flexman were not previously known, so that it could not be stated that the discoloration and decomposition problems of such compositions would be known or obvious, nor that polycarbodiimides would solve these problems, nor that other well known stabilizers for polyoxymethylenes would not solve these problems, nor that polycarbodiimides would solve these problems without also adversely affecting the unique properties of such compositions, including their extraordinary impact resistance and/or toughness.

DISCLOSURE OF THE INVENTION

This invention relates to certain polyoxymethylene compositions which are characterized by improved resistance to discoloration and decomposition. The term "polyoxymethyleneG" as used herein includes homopolymers of formaldehyde or of cyclic oligomers of formaldehyde, the terminal groups of which are end-capped by esterification or etherification.

It has been found that toughened and/or impact resistant polyoxymethylene compositions consisting essentially of
(a) 5-40 weight percent of at least one thermoplastic polyurethane, which polyurethane has a glass transition temperature of lower than 0° C., and
(b) 60-95 weight percent of at least one polyoxymethylene polymer, which polyoxymethylene polymer has a number average molecular weight polymer, of from 20,000 to 100,000.
the above-stated percentages being based on the total amount of components (a) and (b) only, discolor and/or decompose under certain conditions, particularly when hold-up time is excessive during molding or other melt processing operations.

It has been further been found that the discoloration and decomposition of such polyoxymethylene/polyurethane compositions can be significantly reduced or eliminated by incorporating into such polyoxymethylene/polyurethane compositions a small quantity of certain polycarbodiimides, namely a polycarbodiimide (or a mixture of polycarbodiimides) having a number average molecular weight of about 1000 and containing units of the formula

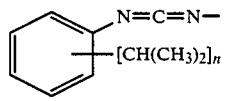

where $n$ has an average value of about 3. More specifically, it has been found that the discoloration and decomposition of such polyoxymethylene/polyurethane compositions can be significantly reduced or eliminated by blending with such polyoxymethylene/polyurethane compositions 0.05-1.0 weight percent of the above-identified polycarbodiimides.

It has further been found that this small quantity of such polycarbodiimides will be effective in reducing discoloration and decomposition of such polyoxymethylene/polyurethane compositions, if they are incorporated into such polyoxymethylene/polyurethane compositions at any time prior to molding of such compositions. That is, the polycarbodiimides can be blended with the polyoxymethylene, followed by blending the polyurethane with the polyoxymethylene/polycarbodiimide mixture. Alternatively, the polycarbodiimide can be blended with the polyurethane, followed by blending the polyoxymethylene with the polyurethane/polycarbodiimide mixture. Alternatively, the polyoxymethylene can be blended with polyurethane, followed by blending the polycarbodiimide with the polyoxymethylene/polyurethane mixture. Alternatively, all three of these ingredients may be blended simultaneously. All that is required is that the polycarbodiimide be reasonably evenly distributed throughout the polyoxymethylene/polyurethane composition.

It has further been found that of the many and varied compounds that are known to be useful for stabilizing polyoxymethylene or polyurethane compositions, only the polycarbodiimides described above will significantly reduce or eliminate discoloration and decomposition of the polyoxymethylene/polyurethane compositions described above.

Accordingly, compositions of the present invention will consist essentially of
(a) 5-40 weight percent of at least one thermoplastic polyurethane, which polyurethane has a glass transition temperature of lower than 0° C.
(b) 0.05-1.0 weight percent of at least one polycarbodiimide having a number average molecular weight of about 1000 and containing units of the formula

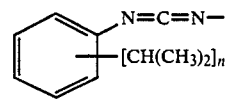

where n has an average value of about 3, and
(c) a complemental amount of at least one polyoxymethylene polymer, which polyoxymethylene polymer has a number average molecular weight of from 20,000 to 100,000.

Various other ingredients, modifiers and/or additives can be included in the compositions of the present invention without significantly altering the essential features of the present invention as described herein.

For compositions containing 5-15 weight percent polyurethane, such as described in copending U.S. Ser. No. 464,412, preferably the Gardner impact value will be greater than 9 J (80 in-lb), more preferably greater than 17 J (150 in-lb), and most preferably greater than 25 J (225 in-lb). For compositions containing 15-'- weight percent polyurethane, such as described in copending U.S. Ser. No. 464,411 preferably the Izod value will be greater than 375 J/m (7.0 ft-lb/in), more preferably greater than 500 J/m (9.4 ft-lb/in), and most preferably greater than 650 J/m (12.2 ft-lb/in).

For compositions containing 5-40 weight percent polyurethane, such as described in copending U.S. Ser. No. 464,411 and U.S. Ser. No. 464,412, it is preferred to incorporate therein 0.05-1.0 weight percent of the above-described polycarbodiimide, more preferably 0.075 to 0.4 weight percent and most preferably about 0.1 weight percent of such polycarbodiimides. These preferences are based on both technological and economic considerations.

It has further been found that incorporation of 0.05-1.0 weight percent of the above-described polycarbodiimides into the polyoxymethylene/polyurethane compositions described above does not adversely affect the other important physical properties of such polyoxymethylene/polyurethane compositions, including extraordinary toughness and/or impact resistance and high stiffness, strength, chemical stability and solvent resistance.

It should be noted that, with respect to compositions containing 5-15 weight percent polyurethane, for compositions having extraordinary impact resistance the polyoxymethylene polymer can be branched or linear and must have a number average molecular weight in the range of 20,000 to 100,000, preferably 25,000 to 90,000, more preferably 30,000 to 70,000, and most preferably 35,000 to 40,000.

As an alternative to characterizing the polyoxymethylene by its molecular weight, it can be characterized by its melt flow rate. Polyoxymethylenes which are preferred for compositions having extraordinary impact resistance will have a melt flow rate (measured according to ASTM D-1238, Procedure A, Condition G with a 1.0 mm (0.0413 inch) (diameter orifice) of 0.1–30 grams/10 minutes. Preferably, the melt flow rate of the polyoxymethylene will be from 0.5–10 grams/10 minutes, most preferably about 5 grams/10 minutes for homopolymer. The most preferred homopolymers for use in compositions having extraordinary impact resistance are those with a number average molecular weight of about 38,000 and those with terminal hydroxyl groups which have been end-capped by a chemical reaction to form ester or ether groups, preferably acetate or methoxy groups, respectively.

Thermoplastic polyurethanes preferred for use in compositions having extraordinary impact resistance can be selected from those commercially available or can be made by processes known in the art. (See, for example, Rubber Technology, 2nd edition, edited by Maurice Morton (1973), Chapter 17, Urethane Elastomers, D. A. Meyer, especially pp. 453–6). Polyurethanes are derived from the reaction of polyester or polyether polyols with diisocyanates and optionally also from the further reaction of such components with chain-extending agents such as low molecular weight polyols, preferably diols. Polyurethane elastomers are generally composed of soft segments, for example polyether or polyester polyols, and hard segments, derived from the reaction of the low molecular weight diols and diisocyanates. While a polyurethane elastomer with no hard segments can be used, those most useful will contain both soft and hard segments.

In the preparation of the thermoplastic polyurethanes, preferred for use in compositions having extraordinary impact resistance, a polymeric soft segment material having at least two hydroxyl groups per molecule and having a number average molecular weight of at least about 500 and preferably from about 550 to about 5,000 and most preferably from about 2,500 to about 3,000, such as a dihydric polyester or a polyalkylene ether diol, is reacted with an organic diisocyanate in a ratio such that a substantially linear polyurethane polymer results, although some branching can be present. A diol chain extender having a molecular weight less than about 250 may also be incorporated. The mole ratio of isocyanate to hydroxyl in the polymer is preferably from about 0.95 to 1.08, more preferably 0.95 to 1.05, and most preferably, 0.95 to 1.00.

Suitable polyester polyols include the polyesterification products of one or more dihydric alcohols with one or more dicarboxylic acids. Suitable dicarboxylic acids include adipic acid, succinic acid, sebacic acid, suberic acid, methyladipic acid, glutaric acid, pimelic acid, azelaic acid, thiodipropionic acid and citraconic acid and mixtures thereof. Suitable dihydric alcohols include ethylene glycol, propylene glycol, 1,4-butanediol, 1,3-butanediol, 2-methyl pentane diol-1,5, diethylene glycol, pentanediol, hexanediol and mixtures thereof.

Further, hydroxycarboxylic acids, lactones, and cyclic carbonates, such as caprolactone and hydroxybutyric acid can be used in the preparation of the polyester.

Preferred polyesters include poly(ethylene adipate), poly(1,4-butylene adipate), mixtures of these adipates and polycaprolactone.

Suitable polyether polyols include the condensation products of one or more alkylene oxides with a small amount of one or more compounds having active hydrogen containing groups, such as water, ethylene glycol, 1,2-or 1,3-propylene glycol, 1,4-butane diol and 1.5-pentanediol, and mixtures thereof. Suitable alkylene oxide condensates include those of ethylene oxide, 1,2-propylene oxide and butylene oxide and mixtures thereof. Suitable polyalkylene ether glycols may also be prepared from tetrahydrofuran. In addition, suitable polyether polyols can contain comonomers, especially as random or block comonomers, ether glycols derived from ethylene oxide and propylene oxide and/or tetrahydrofuran (THF). Alternatively, a THF polyether copolymer with minor amounts of 3-methyl THF can also be used.

Preferred polyethers include polytetramethylene ether glycol (PTMEG), polypropylene oxide, copolymers of propylene oxide and ethylene oxide, and copolymers of tetrahydrofuran and ethylene oxide.

Suitable organic diisocyanates include 1,4-butylene diisocyanate, 1,6-hexamethylene diisocyanate, cyclopentylene-1,3diisocyanate, 4,4'-dicyclohexylmethane diisocyanate, isophorone diisocyanate, cyclohexylene-1,4-diisocyanate, 2,4-tolylene diisocyanate,2,6-tolylene diisocyanate, isomeric mixtures of 2,4-and 2,6-tolylene diisocyanate, 4,4'-methylene bis(phenylisocyanate), 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, 4,4'-diphenyl diisocyanate, azobenzene-4, 4'-diisocyanate, m- or p-tetramethylxylene diisocyanate and 1-chlorobenzene-2,4-diisocyanate. 4,4'-Methylene bis(phenylisocyanate), 1,6-hexamethylene diisocyanate, 4,4'-dicyclohexylmethane diisocyanate and 2,4-tolylene diisocyanate are preferred.

Secondary amide linkages including those derived from adipyl chloride and piperazine, and secondary urethane linkages, including those derived from the bis-chloroformates of PTMEG and/or butanediol, can also be present in the polyurethanes.

Dihydric alcohols suitable for use as chain extending agents in the preparation of the thermoplastic polyurethanes include those containing carbon chains which are either uninterrupted or which are interrupted by oxygen or sulfur linkages, including 1,2-ethanediol, 1,2-propanediol, isoprophyl-a-glyceryl ether, 1,3-propanediol, 1,3-butanediol, 2,2-dimethyl-1,3-propanediol, 2,2 -diethyl-1,3-propanediol, 2-ethyl-2-butyl-1,3 -propanediol, 2-methyl-2,4-pentanediol, 2,2,4-trimethyl-1,3-pentanediol, 2-ethyl-1,3hexanediol, 1,4-butanediol, 2,5-hexanediol, 1,5-pentanediol, dihydroxycyclopentane, 1,6-hexanediol, 1,4-cyclohexanediol, 4,4'-cyclohexanedimethylol, thiodiglycol, diethylene glycol, dipropylene glycol, 2-methyl-1,3-propanediol, 2-methyl-2-ethyl-1, 3propanediol, dihydroxyethyl ether of hydroquinone, hydrogenated bisphenol A, dihydroxyethyl terephthalate and dihydroxymethyl benzene and mixtures thereof, 1,4-butane diol, 1,2-ethane diol and 1,6-hexane diol are preferred.

In the preparation of the thermoplastic polyurethanes the ratio of isocyanate to hydroxyl should be close to unity, and the reaction can be a one step or a two step reaction. Catalyst can be used, and the reaction can be run neat or in a solvent.

Apart from what is described above concerning selection of the polyurethane, the most important characteristic of the thermoplastic polyurethane with respect to obtaining compositions having extraordinary impact resistance is its glass transition temperature (Tg). Wherever a glass transition temperature is reported herein, it is as determined using a Du Pont Model 981 Dynamic Mechanical Analysis Cell attached to a Model 990 Thermal Analyzer. The cell is modified to use liquid nitrogen as the coolant and to allow the use of a 3.2 cm (1.25 inch) gap holding the specimen. The oscillation amplitude is set at 0.2 mm. A heating rate of 2.5° C./min is used from −170 ° C. to 0 to 40° C. depending on the signal amplitude. Readings are taken every 1° C. increment. The storage and loss moduli are plotted and the major loss modulus peak is defined as the soft segment glass transition temperature. Compositions having extraordinary impact resistance can best be made when the soft segment glass transition temperature of the thermoplastic polyurethane is less than 0° C. Preferably, the soft segment glass transition temperature of the polyurethane should be less than −10° C., more preferably below −15° C., and most preferably below −30° C. Combinations or mixtures of thermoplastic polyurethanes can also be used.

For compositions having extraordinary impact resistance the number average molecular weight of the soft segment of the thermoplastic polyurethane should average between about 500 and about 5000, preferably about 850-3000, more preferably about 1000-2500, with the most preferred polyurethanes having soft segments with an average molecular weight of about 2000.

Similarly, for compositions having extraordinary impact resistance, the moisture content of the composition, and of the polyurethane, should be less than 0.2 percent by weight of water, preferably less than 0.1 percent, especially when there is no opportunity for the water to escape, for example during injection molding.

For compositions having extraordinary impact resistance the polyurethane must be intimately mixed and dispersed as discrete particles in the polyoxymethylene, and it must be maintained in that state during the formation of the finished products.

Any intensive mixing device capable of developing high shear at temperatures above the melting points of the ingredients can be use to disperse the polyurethane in the polyoxymethylene and to incorporate the polycarbodiimide into the polyoxymethylene/polyurethane compositions. Examples of such devices include rubber mills, internal mixers such as 'Banbury' and 'Brabender' mixers, single or multiblade internal mixers with a cavity heated externally or by friction, 'Ko-kneaders', multibarrel mixers such as 'Farrel Continuous Mixers', injection molding machines, and extruders, both single screw and twin screw, both co-rotating and counter rotating. These devices can be used alone or in combination with static mixers, mixing torpedos and/or various devices to increase internal pressure and/or the intensity of mixing such as valves, gates or screws designed for this purpose. Continuous devices are preferred. Twin screw extruders are especially preferred, particularly those incorporating high intensity mixing sections such as reverse pitch elements and kneading elements. For example, a mixing device useful in the preparation of compositions of the present application is a 28 mm co-rotating Werner and Pfleiderer twin screw extruder, using a screw design containing two working sections with a total of five kneading elements, two reverse elements, and a vacuum port at about 70% of the distance from the feed throat to the die. All zones can be set at 190° C. Temperature of the melt coming out of the die can be about 220-260° C. A low flow of cooling water can be used to reduce temperatures. The extruder can be operated at 220-250 rpm with 6.8-13.6 kg (15-30 pounds) per hour throughput. A nitrogen blanket can be maintained over the feed throat to exclude oxygen and preserve dryness of the ingredients, and the strand exiting the die can be quenched in water and cut into pellets. One can deviate from those conditions. For example melt temperatures below 190° C. or higher than 260° C. are possible if throughput is adjusted to compensate. However, 170-260° C. is considered preferred, with 185-240° C. more preferred, and 200-230° C. most preferred for melt compounding.

For compositions having extraordinary impact resistance it is important to maintain the conditions created in the melt compounded material, such as distribution of the thermoplastic polyurethane as discrete particles in the polyoxymethylene, dryness of the composition, etc. Shaped articles made from the compositions of the present invention can be made by any of several common methods, including compression molding, injection molding, extrusion blow molding, rotational molding, thermoforming and stamping. Such shaped articles can be post treated by orientation, stretching, coating, annealing, painting, laminating and plating. Unused shaped articles, rejected shaped articles or waste composition of the present invention can be ground and remolded.

Generally, the conditions used in the preparation of shaped articles will be similar to those described above for melt compounding. More specifically, melt temperatures and residence times can be used up to the points at which significant degradation of the composition occurs. Preferably, the melt temperature will be about 170°-250° C., more preferably about 185°-240° C., and most preferably about 200°-230 ° C. When injection molding the compositions of the present invention, it is preferable that the mold be as cold as possible consistent with the intricacy of the shape being produced. However, colder molds are harder to fill, particularly where the passages may be narrow or the shape is intricate. Generally, the mold temperature will be 10°-120° C., preferably 10°-100° C., and most preferably the mold temperature will be about 50°-90° C. Similarly, the cycle time, which determines the total hold-up time in the melt, can be adjusted to fit the particular conditions being encountered. For example, if the total hold-up time in the melt is too long, the composition can degrade. If the cycle time is too short, the shaped article may not totally solidify while the mold is still under pressure. Generally, total hold-up time in the melt will be about 3-15 minutes, with the shorter times being preferred, consistent with giving a high quality shaped article.

The preferences stated above with respect to the preparation of compositions containing 5-15 weight percent polyurethane and having extraordinary impact resistance will hold for the preparation of compositions containing >15-40 weight percent polyurethane and having extraordinary toughness except as specified below. Certain additional preferences stated below will apply to the preparation of compositions containing 15-40 weight percent polyurethane and having extraordinary toughness.

For compositions having extraordinary toughness the polyoxymethylene polymer will preferably have a number average molecular weight in the range of 20,000 to 100,000, preferably 25,000 to 90,000, more preferably 30,000 to 70,000, and most preferably 60,000–70,000.

As an alternative to characterizing the polyoxymethylene by its weight average molecular weight, it can be characterized by its melt flow rate. Polyoxymethylenes which are preferred for compositions having extraordinary toughness will have a melt flow rate (measured according to ASTM D-1238, Procedure A, Condition G with a 1.0 mm (0.0413 inch) diameter orifice) of 0.1–30 grams/10 minutes. Preferably, the melt flow rate of the polyoxymethylene used in the compositions of the present invention will be from 0.5–10 grams/10 minutes. The most preferred polyoxymethylenes are linear polyoxymethylenes with a melt flow rate of about 1 gram/10 minutes. The most preferred homopolymers for use in compositions having extraordinary toughness are those with a number average molecular weight of about 65,000 and those with terminal hydroxyl groups which have been end-capped by a chemical reaction to form ester or ether groups, preferably acetate or methoxy groups, respectively. For compositions having extraordinary toughness the polyoxymethylene polymer will comprise the continuous phase of such compositions and the thermoplastic polyurethane will be dispersed throughout the continuous phase polyoxymethylene. The thermoplastic polyurethane can comprise discrete particles dispersed throughout the polyoxymethylene continuous phase, and this configuration is most commonly found when the proportion of polyurethane in the composition is relatively low. These particles of polyurethane can be approximately spherical in shape (i.e. the particles will have an aspect ratio approximately equal to 1.0) or elongated (i.e. the particles will have an aspect ratio substantially greater than 1.0) and their size distribution can be Gaussian, bi- or polymodal, or other. If elongated, they can be only slightly elongated and approximately oval in shape, or they can be greatly elongated and resemble strands of thermoplastic polyurethane running through the polyoxymethylene continuous phase. In fact it is possible for such strands to run continuously the full length of an article made from such compositions. Alternatively, such stands can be interconnected so as to form a network of thermoplastic polyurethane throughout the polyoxymethylene continuous phase, and this configuration is most commonly found when the proportion of polyurethane in the composition is relatively high.

It has been observed that when the polyurethane phase elongated, the direction of elongation is generally the same for all the phase and is generally in the direction of the shear applied during the final stage of the preparation of the composition while still in its molten state. For example, in the preparation of such compositions in a rod shape by melt compounding in a twin-screw extruder, followed by passage through a round die and quenching in water, the elongation, if any, of the thermoplastic polyurethane will generally run parallel to the axis of the rod. It has been found most useful for the purpose of characterizing such compositions to measure average cross-sectional size of the polyurethane phase in a plane perpendicular to the direction of elongation and in the center of the formed article.

Average cross-sectional size is measured by the following technique. A 'Sorvall' MT-2B ultra-microtome equipped with a diamond knife and a "Sorvall-Christensen" FTS-LTC-2 sectioner, operating at $-90°$ C., is used to cut sections 200 nanometers thick from the center area of a molded $0.32 \times 1.27 \times 12.7$ cm ($\frac{1}{8} \times \frac{1}{2} \times 5$ in) bar perpendicular to the bar axis. Ethanol is used as a knife lubricant and a number of slices are collected and then placed a petri dish containing distilled water. The mixing action of the ethanol and water spreads the microtomed slices apart and allows them to float on the top of the water. The microtomed slices are placed on a 200 mesh copper microscope grid. Electron photomicrographs of typical areas are photographed at 2500X using a Zeiss EM10A electron microscope at 80 KV equipped with a 70 mm roll film camera and Eastman 5302 film. Darkroom enlargements of the microscope negatives results in final $20.3 \times 25.4$ cm ($8 \times 10$ in) photomicrographs at 11,800X.

Two $10.2 \times 12.7$ cm ($4 \times 5$ in) pieces are cut from each $20.3 \times 25.4$ cm ($8 \times 10$ in) photomicrograph with the 12.7 cm (5 in) edge of each piece parallel to the preferential direction, if any, in which most of the polyurethane was oriented. Most photomicrographs have such a direction. Each photomicrograph is scanned across the short dimension one row at a time by a flying spot scanner 200 microns square. This photomicrograph line of spots appears as a pattern of light and dark areas with varying levels of grey between them. The average density of this line is calculated. All images darker (more dense) than this average value are considered to be the thermoplastic polyurethane phase. Conversely, all images lighter than this line are considered to be the polyoxymethylene matrix. The mean length of the up pulses (dark areas or thermoplastic polyurethane phase) is calculated. This measure is referred to hereinafter the average cross-sectional size in the minimum dimension.

Compositions having extraordinary toughness can be made when the average cross-sectional particle size of the thermoplastic polyurethane is not greater than 0.9 microns. Preferably the average cross-sectional size of the thermoplastic polyurethane will be less than 0.7 microns, most preferably less than 0.5 microns. As a practical matter, the polyurethane phase should also have an average cross-sectional size of at least 0.01 microns.

Apart from what is described above concerning selection of the polyurethane, the most important characteristic of the thermoplastic polyurethane with respect to obtaining compositions having extraordinary toughness is its soft-segment glass transition temperature (Tg). Compositions having extraordinary toughness can best be made when the soft segment glass transition temperature of the thermoplastic polyurethane is less than $-15°$ C. Preferably, the soft segment glass transition temperature of the polyurethane should be less than $-20°$ C. and most preferably below $-30°$ C. Combinations or mixtures of thermoplastic polyurethanes can also be used. For compositions having extraordinary toughness one should generally use a thermoplastic polyurethane with an inherent viscosity of 0.7 or above (as measured by ASTM D-2857 with a "Schott" automatic viscometer at 0.1% polyurethane in dimethyl formamide at 30° C.). Thermoplastic polyurethanes having inherent viscosities up to 2.7 have been used successfully in such compositions, but those having inherent viscosities of 0.75–2.5 are generally preferred, with those having inherent viscosities of 1.0–1.7 being most preferred. Alternatively, it is possible to start with a polyurethane having a very low inherent viscosity, and then modify it during the blending operation, e.g.

by further polymerization or cross-linking, thus increasing the effective viscosity of the polyurethane to a desirable level, even though the inherent viscosity of the starting material polyurethane was quite low. Alternatively, one could begin with a polyurethane having a higher inherent viscosity and degrade or hydrolyze it during compounding to obtain the desired effective viscosity.

In the following examples, there are shown specific embodiments of the present invention and certain side-by comparisons with embodiments of control experiments with compositions containing alternative compounds generally used to increase stability of polyoxymethylene compositions. It will be seen that the compositions of the present invention are characterized by significantly reduced or eliminated discoloration during the melt compounding and molding stages, and significantly reduced decomposition, as measured by loss of weight, tensile strength and elongation upon being subjected to heating in an air oven and boiling in water, while the control compositions are not. All parts and percentages are by weight, and all temperatures are in degrees Celsius unless otherwise specified. Measurements not originally in SI units have been so converted and rounded where appropriate.

In each of the following examples, injection molded samples were prepared from melt compounded resin. All of the resins (unless stated otherwise) contained 2 weight percent of a polyamide stabilizer (terpolymer of approximately 38% polycaprolactan /35% polyhexamethylene adipamide/27% Polyhexamethylene sebacamide) and 0.1 weight percent of a phenolic antioxidant [2,2'-methylene bis(6-t-butyl-4-methyl phenol)]. Certain resins (as indicated in the following Tables) also contained a lubricant (ethylene bis-stearamide) and a polycarbodiimide (a mixture of hindered polycarbodiimides having a number average molecular weight of about 1000 and containing units of the formula

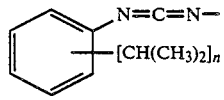

where n has an average value of about 3.

In all of the following Examples, polyoxymethylene A was an acetate end-capped polyoxymethylene homopolymer having a number average molecular weight of about 38,000, and polyoxymethylene B was a similar polymer with a number average molecular weight about 63,000. Both thermoplastic polyurethanes had a chemical composition of about 37 weight percent adipic acid, 39 weight percent butane diol, and 24 weight percent methylene bisphenyl isocyanate and had a glass transition temperature of $-35°$ C. Polyurethane A had an inherent viscosity of 1.33 and contained 0.6% ethylene bis-stearamide. Polyurethane B had an inherent viscosity of 1.04 and contained 0.2% ethylene bis-stearamide.

All of the resins were melt compounded in a 28mm Werner and Pfleiderer twin screw extruder as described in greater detail above. To exclude air, the hopper and feed throat were purged with nitrogen. The extruder barrel and die were heated to 180° C., and the extruder was operated at a screw speed of about 200 rpm. The strand of melt was quenched in water, cut into pellets and dried.

Samples to be used in the discoloration tests were made in a 125 ton Spartan injection molding machine manufactured by HPM Inc. This unit was equipped with a screw injection unit having a 4.5 cm (1.75 in) diameter screw and a mold for 0.32 cm (⅛in) thick test bars. The total shot weight was 53 grams. The test bars were molded at cylinder and nozzle temperatures of 188° C., mold temperature 60° C., overall cycle 65 seconds and screw speed of 60 rpm. For each example, ten shots were molded under these standard conditions and then molding was stopped. Heating of the machine was continued. After 10 or 15 minutes (as specified in the Table) molding was continued, and the next ten shots were collected and numbered in sequence.

Samples to be used in the decomposition tests (i.e., the boiling water and circulating air oven tests) were molded using a 125 ton Van Dorn injection molding machine equipped with a 40 mm diameter screw injection unit and mold cavities for molding a 0.32 cm (⅛in) thick tensile bar and two cavities for molding test bars measuring 0.32×1.27 ×12.7 cm (⅛×½×5 in). Cylinder and nozzle temperatures were set at 200° C., and the mold temperature was set at 60°–90° C. Other conditions were: cycle time —65 sec, screw speed —60 rpm, and oil pressure for injection —9.6–11 MPa.

Discoloration was measured by taking a 12.7×1.27×0.32 cm (5×½×⅛in) test bar from each of the ten shots. They were put into a stock measuring 12.7×1.27×3.2 cm (5×½×10/8 in), and the 12.7×3.2 cm (5×10/8 in) surface made up of the ten bars was used for the color measurement. Color measurements were made with a Hunterlab tristimulus colorimeter Model D25P-2. Color was measured by reflection using the "L" scale. "L" measures lightness and varies from 100 for perfect white to zero for black. A stack of test bars was placed over the 2.85 cm (1.125 in) diameter sample window and "L" readings were taken. Three readings with different sample positions were averaged.

To test the resistance of the samples to decomposition the air oven aging tests were carried out in a circulating air oven manufactured by The Electric Hotpack Company, Inc. It was operated at 130° C. Test bars which had been numbered and weighed were put in a test tube rack which allowed for good circulation of air between the samples when the rack was placed in the oven. Test bars were removed from the oven and weighed after cooling. Most specimens were then evaluated in a tensile test. Some were placed back in the oven for additional aging before tensile testing. Some had lost so much weight that testing was not possible or meaningful. The boiling water tests were carried out in four-liter glass reaction kettles equipped with a heating mantle and a reflux condenser. They were filled to an appropriate level with distilled water. Water level was maintained by adding more distilled water as needed. Test bars which had been numbered and weighed were placed loose in the boiling water. A separate kettle was used for each composition. After exposure, specimens were dried overnight in a vacuum oven at 80° C. Then they were weighed and tested. Tensile tests were carried out on 0.32 cm (⅛in) thick ASTM D638 tensile bars. A type 1 specimen with the preferred overall length of 21.6 cm (8.5 inches) was used. All specimens were tested at speed C, 5 cm (2.0 in) per minute. Tensile strength and elongation were measured as described in ASTM D638. Results reported for these weight loss and tensile tests represent the average of at least three samples each.

Examples 1–12

In each of Examples 1–10 summarized in Tables I and II, 30% of polyurethane A was blended with the stated quantities of polyamide stabilizer, phenolic antioxidant, added lubricant (in addition to what was in the polyurethane), polycarbodiimide, and a complemental amount of polyoxymethylene B.

In Examples 11 and 12 summarized in Table II, 10% of polyurethane A was blended with the stated quantities of polyamide stabilizer, phenolic antioxidant, polycarbodiimide and a complemental amount of polyoxymethylene A.

It can be seen from the data in Tables I and II that, even under the extreme conditions of a 10 or 15 minute hold-up, as little as 0.1 weight percent polycarbodiimide will give a significant reduction in the discoloration of the polyoxymethylene/polyurethane compositions, while even increased quantities of the usual polyamide stabilizer and phenolic antioxidant do not show any reduction in discoloration.

TABLE I

| Example No. | Polyamide Stabilizer (%) | Phenolic antioxidant (%) | Lubricant (%) | Polycarbodiimide (%) | Hold-Up Time (Min) | Added Colorimeter "L" Scale Reading |
|---|---|---|---|---|---|---|
| 1 | 0.75 | 0.11 | 0.6 | 0 | 0 | 81 |
|   |      |      |     |   | 10 | 67 |
| 2 | 3 | 0.11 | 0.6 | 0 | 0 | 81 |
|   |   |      |     |   | 10 | 67 |
| 3 | 0.75 | 0.44 | 0.6 | 0 | 0 | 79 |
|   |      |      |     |   | 10 | 53 |
| 4 | 3 | 0.44 | 0.6 | 0 | 0 | 77 |
|   |   |      |     |   | 10 | 55 |
| 5 | 0.75 | 0.11 | 0.6 | 0.1 | 0 | 81 |
|   |      |      |     |     | 10 | 75 |
| 6 | 0.75 | 0.11 | 0.6 | 0.3 | 0 | 79 |
|   |      |      |     |     | 10 | 77 |

TABLE II

| Example No. | Polyamide Stabilizer (%) | Phenolic antioxidant (%) | Lubricant (%) | Polycarbodiimide (%) | Added Hold-Up Time (Min) | Colorimeter "L" Scale Reading |
|---|---|---|---|---|---|---|
| 7 | 0.75 | 0.11 | 0 | 0 | 0 | 80 |
|   |      |      |   |   | 15 | 53 |
| 8 | 0.75 | 0.11 | 0 | 0.1 | 0 | 81 |
|   |      |      |   |     | 15 | 67 |
| 9 | 0.75 | 0.11 | 0.6 | 0.1 | 0 | 80 |
|   |      |      |     |     | 15 | 60 |
| 10 | 0.75 | 0.11 | 0.6 | 0.3 | 0 | 79 |
|    |      |      |     |     | 15 | 66 |
| 11 | 0.75 | 0.11 | 0 | 0 | 0 | 79 |
|    |      |      |   |   | 15 | 57 |
| 12 | 0.75 | 0.11 | 0 | 0.1 | 0 | 82 |
|    |      |      |   |     | 15 | 64 |

TABLE III

| | Sample A | | | Sample B | | |
|---|---|---|---|---|---|---|
| Exposure Days | Wt Loss (%) | Ten Str (MPa) | Elong (%) | Wt Loss (%) | Ten Str (MPa) | Elong (%) |
| 0 | — | 58 | 43 | — | 56 | 47 |
| Air Oven Aging at 130° C. | | | | | | |
| 10 | 0.9 | 58 | 23 | 0.5 | 59 | 24 |
| 20 | 1.9 | 57 | 20 | 0.5 | 59 | 25 |
| 31 | 2.9 | 56 | 23 | 0.5 | 58 | 21 |
| 45 | 5.8 | 18 | 0.2 | 0.9 | 59 | 21 |
| Boiling Water | | | | | | |
| 20 | 8.5 | 48 | 27 | 1.3 | 56 | 41 |
| 31 | 27 | 23 | 6 | 3.7 | 54 | 33 |
| 45 | | | | 15.0 | | |

It can be seen from the data in Table III that weight loss from air oven aging at 130° C. in compositions without polycarbodiimide at 10 days is comparable to weight loss in compositions with polycarbodiimide at 45 days. Similarly, weight loss from boiling water in compositions without polycarbodiimide at 31 days is greater than weight loss in compositions with plycarbodiimide at 45 days.

Example 13

Sample A in Table III contained 87.9% polyoxymethylene A and 10% polyurethane B. Sample B contained 87.6% polyoxymethylene A, 10% polyurethane B and 0.3 weight percent of the polycarbodiimide. Samples A and B also contained 2 weight % polyamide stabilizer and 0.1 weight % phenolic antioxidant.

Example 14

Sample A in Table IV contained 87.9% polyoxymethylene A and 10% polyurethane A. Sample B contained 87.6% polyoxymethylene A, 10% polyurethane A and 0.3% of the polycarbodiimide. Sample C contained 87.3% polyoxymethylene A, 10% polyurethane A and 0.6% of the polycarbodiimide. Samples A, B and C also contained 2 weight % polyamide stabilizer and 0.1 weight % phenolic antioxidant.

TABLE IV

| Exposure (Days) | Sample A Wt Loss (%) | Sample A Ten Str (MPa) | Sample A Elong (%) | Sample B Wt Loss (%) | Sample B Ten Str (MPa) | Sample B Elong (%) | Sample C Wt Loss (%) | Sample C Ten Str (MPa) | Sample C Elong (%) |
|---|---|---|---|---|---|---|---|---|---|
| 0 | — | 60 | 62 | — | 57 | 43 | — | 56 | 51 |
| Air Oven at 130° C. | | | | | | | | | |
| 10 | 0.9 | 58 | 28 | 0.2 | 60 | 32 | 0.3 | 60 | 28 |
| 20 | 1.5 | 57 | 27 | 0.1 | 59 | 23 | 0.1 | 59 | 23 |
| 31 | 2.1 | 56 | 21 | 0.4 | 59 | 21 | 0.03 | 59 | 22 |
| 40 | 4.8 | 27 | 1 | 0.4 | 59 | 19 | 0.6 | 57 | 18 |
| 50 | 6.8 | — | — | 0.6 | 58 | 17 | 0.5 | 57 | 15 |
| 60 | 9.5 | — | — | 1.2 | — | — | 1.3 | — | — |
| 70 | — | — | — | 1.7 | — | — | 2.3 | — | — |
| 80 | — | — | — | 2.5 | 55 | 14 | 3.0 | 51 | 9.7 |
| Boiling Water | | | | | | | | | |
| 10 | 0.8 | 58 | 26 | 1.0 | 61 | 24 | 0.9 | 61 | 24 |
| 20 | 7.2 | 54 | 25 | 1.3 | 59 | 20 | 1.3 | 59 | 23 |
| 31 | 18 | 37 | 7.7 | 4.6 | 53 | 23 | 2.4 | 57 | 29 |
| 40 | 36 | — | — | 11 | — | — | 8.3 | 55 | 26 |

A comparison of the weight loss data in Table IV again shows the significant improvement in resistance to decomposition in polyoxymethylene/polyurethane compositions containing small amounts of the polycarbodiimide.

Example 15

Sample A in Table V contained 67.9% polyoxymethylene B and 30% polyurethane A. Sample B contained 67.6% polyoxymethylene B, 30% polyurethane A, and 0.3% of the polycarbodiimide. Sample C contained 67.3% polyoxymethylene B, 30% polyurethane A, and 0.6% of the polycarbodiimide. Samples A, B and C also contained 2 weight % polyamide stabilizer and 0.1 weight % phenolic antioxidant. Izod values were determined for Samples A, B, and C using ASTM D-256, Method A. Specimens were cut from molded test bars 0.32×1.27×12.7 cm (⅛×½×5 in). Values determined were 800, 854 and 800 J/m, respectively for Samples A, B and C (prior to heat aging). Thus, the extraordinary toughness of these samples is not adversely affected by incorporation of polycarbodiimide.

TABLE V

| Exposure (Days) | Sample A Wt Loss (%) | Sample A Ten Str (MPa) | Sample A Elong (%) | Sample B Wt Loss (%) | Sample B Ten Str (MPa) | Sample B Elong (%) | Sample C Wt Loss (%) | Sample C Ten Str (MPa) | Sample C Elong (%) |
|---|---|---|---|---|---|---|---|---|---|
| 0 | — | 43 | 211 | — | 41 | 323 | — | 41 | 280 |
| Air Oven at 130° C. | | | | | | | | | |
| 10 | 0.4 | 48 | 88 | 0.3 | 50 | 130 | 0.4 | 50 | 72 |
| 20 | 0.7 | 50 | 81 | 0.6 | 50 | 87 | 0.6 | 50 | 72 |
| 31 | 1.1 | 49 | 78 | 0.8 | 50 | 76 | 0.9 | 50 | 67 |
| 40 | 1.8 | 47 | 63 | 1.0 | 48 | 66 | 1.1 | 50 | 64 |
| 50 | 3.0 | 46 | 58 | 1.2 | 48 | 69 | 1.4 | 49 | 56 |
| 60 | 4.9 | 43 | 55 | 1.5 | — | — | 1.8 | — | — |
| 70 | — | — | — | 2.1 | — | — | 2.2 | — | — |
| 80 | — | — | — | 3.1 | 44 | 49 | 2.7 | 46 | 48 |
| Boiling Water | | | | | | | | | |
| 10 | 1.7 | 37 | 24 | 0.8 | 48 | 82 | 0.9 | 49 | 48 |
| 20 | 23 | 35 | 13 | 1.5 | 40 | 26 | 1.4 | 47 | 41 |
| 31 | 45 | 13 | 4 | 21 | 35 | 16 | 9.5 | 34 | 19 |
| 40 | 77 | — | — | 34 | — | — | 26 | — | — |

A comparison of the weight loss data in Table V again shows the significant improvement in resistance to decomposition in polyoxymethylene/polyurethane compositions containing small amounts of the polycarbodiimide.

Industrial Applicability

The polyoxymethylene compositions of the present invention are useful in the manufacture of finished articles such as sports helmets, safety helmets, shoe cleats, safety steering column components, specialty zippers, railroad tie insulators, ski bindings, mechanical conveyors and small engine components. The extraordinary impact resistance and/or toughness and exceptional wear resistance of articles made from these compositions combined with other outstanding properties normally found in polyoxymethylene compositions make them particularly well suited for applications such as gears, moving parts and fuel tanks.

Best Mode

Although the best mode of the present invention, i.e. the single best polyoxymethylene composition of the present invention, will depend upon the particular desire end use and the specific requisite combination of properties for that use, the single composition and molding conditions of the present invention that result in a product most preferred for its overall balance of properties is described in detail in Example 5 for compositions containing 30 weight percent polyurethane and in Example 12 for compositions containing 10 weight percent polyurethane, except that the composition of Example 12 would be more preferred with 0.2 weight percent added ethylene bis-stearamide. While it is not a part of the present invention, it is preferred to incorporate in the compositions of the present invention about 0.2–1.0 weight percent of ethylene bis-stearamide lubricant, depending on the quantity of polyurethane.

I claim:

1. A thermoplastic polyoxymethylene composition consisting essentially of
   (a) 5–40 weight percent of at least one thermoplastic polyurethane, which polyurethane has a soft segment glass transition temperature of lower than 0° C.,
   (b) 0.05–1.0 weight percent of at least one polycarbodiimide having a number average molecular weight of about 1000 and containing units of the formula

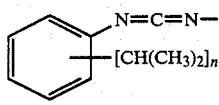

where n has an average value of about 3, and
   (c) a complemental amount of at least one polyoxymethylene polymer, which polyoxymethylene polymer has a number average molecular weight of from 20,000 to 100,000.

2. The composition of claim 1 wherein the quantity of polyurethane is 5–15 weight percent, and the quantity of polycarbodiimide is 0.075–0.4 weight percent.

3. The composition of claim 1 wherein the quantity of polyurethane 15–40 weight percent, and the quantity of polycarbodiimide is 0.075–0.4 weight percent.

4. The composition of claim 2 wherein the polyurethane is dispersed throughout the polyoxymethylene polymer as discrete particles, and the composition has a Gardner impact value of greater than 9 J.

5. The composition of claim 3 wherein the polyurethane has a soft segment glass transition temperature of lower than −15° C., the polyurethane is dispersed throughout the polyoxymethylene polymer as a separate phase having an average cross-sectional size in the minimum dimension of not greater than 0.9 microns, and the composition has an Izod value of greater than 375 J/m.

6. The composition of claim 4 wherein the polyoxymethylene is a homopolymer with a number average molecular weight of 30,000–70,000.

7. The composition of claim 5 wherein the polyoxymethylene is a homopolymer with a number average molecular weight of 30,000–70,000.

8. The composition of claim 4 wherein the Gardner impact value is greater than 25 J.

9. The composition of claim 5 wherein the Izod value is greater than 650 J/m.

10. The composition of claim 4 wherein the thermoplastic polyurethane comprises 8 to 12 weight percent of the composition.

11. The composition of claim 5 wherein the thermoplastic polyurethane comprises 25 to 32 weight percent of the composition.

12. The composition of claim 4 wherein the thermoplastic polyurethane is derived from the reaction of butylene adipate, methylene bis(phenylisocyanate) and 1,4-butane diol.

13. The composition of claim 5 wherein the thermoplastic polyurethane is derived from the reaction of butylene adipate, methylene bis(phenylisocyanate) and 1,4-butane diol.

14. A method for improving the resistance to discoloration and decomposition of a thermoplastic composition, said composition consisting essentially of:
   (a) 5–40 weight percent of at least one thermoplastic polyurethane, which polyurethane has a soft segment glass transition temperature of lower than 0° C., and
   (b) a complemental amount of at least one polyoxymethylene polymer, which polyoxymethylene polymer has a number average molecular weight of from 20,000 to 100,000,
   said method comprising incorporating into the polyoxymethylene composition 0.05–1.0 weight percent of at least one polycarbodiimide having a number average molecular weight of about 1000 and containing units of the formula

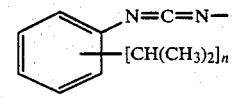

where n has an average value of about 3.

15. The method of claim 14 wherein the quantity of polycarbodiimide is 0.075–0.4 weight percent, and the quantity of polyurethane is 5–15 weight percent.

16. The method of claim 14 wherein the quantity of polycarbodiimide is 0.075–0.4 weight percent, and the quantity of polyurethane is 15–40 weight percent.

17. Shaped articles made from the composition of claim 1.

* * * * *